United States Patent [19]
Bentley

[11] Patent Number: 5,577,325
[45] Date of Patent: Nov. 26, 1996

[54] WOOD CUTTING BLADE ATTACHMENT DEVICE

[76] Inventor: Daniel D. Bentley, 624 S. Hyde Park, Denison, Tex. 75020

[21] Appl. No.: 546,693

[22] Filed: Oct. 23, 1995

[51] Int. Cl.⁶ .................................................. B27B 21/02
[52] U.S. Cl. ................................. 30/507; 30/506; 30/510
[58] Field of Search ............................ 30/506, 507, 510, 30/511, 513, 514

[56] References Cited

U.S. PATENT DOCUMENTS

| 325,157 | 8/1885 | Clemson | 30/507 |
|---|---|---|---|
| 1,258,202 | 3/1918 | Donnelly | 30/513 |
| 1,835,638 | 12/1931 | Cunneen | 30/513 |
| 3,756,298 | 9/1973 | West | 30/507 |
| 4,835,869 | 6/1989 | Waldherr | 30/507 |

Primary Examiner—Hwei-Siu Payer
Attorney, Agent, or Firm—John E. Vandigriff

[57] ABSTRACT

The invention is to the combination of an attachment device and the combination of the attachment device with a saw blade for use with a standard hack saw frame. The attachment device has an arm that is inserted into one end of the hack saw frame where the blade is attached. A saw blade having at least one hole in a first end and a plurality of holes spaced apart in a second end is mounted between the attachment device and the hack saw frame, with one end of the saw blade extending beyond the hack saw frame such that the end of the saw blade extending beyond the hack saw frame can be used to saw in restricted or limited access areas.

10 Claims, 4 Drawing Sheets

5,577,325

WOOD CUTTING BLADE ATTACHMENT DEVICE

FIELD OF THE INVENTION

This invention relates to saw devices, and more particularly to an attachment device and wood cutting blade for a hack saw.

BACKGROUND OF THE INVENTION

Present day hack saws have a single blade with a hole on each end of the blade to attached it to the saw frame and handle. Hack saw blades have teeth that are generally for cutting metal and the blades are oriented to cut in only one direction, but may be used for cutting other materials with varying results.

Bow saws are used for cutting wood. The saw blade is a blade that has teeth that are formed to cut in either direction. Bow saw blades usually have a hole in each end for attaching the blade to the bow saw frame.

For both the hack saw and bow saw, the cutting is in the central portion of the blade since the ends of the blade are used for mounting the blade.

SUMMARY OF THE INVENTION

The invention is for an attachment device and the combination of the attachment device with a saw blade for use with a standard hack saw frame. The attachment device has an arm that is inserted into one end of the hack saw frame where the blade is attached. A saw blade having at least one hole in a first end and a plurality of holes spaced apart in a second end is mounted between the attachment device and the hack saw frame, with one end of the saw blade extending beyond the hack saw frame such that the end of the saw blade extending beyond the hack saw frame can be used to saw in restricted or limited access areas, or used for sawig similar to a key hole saw.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
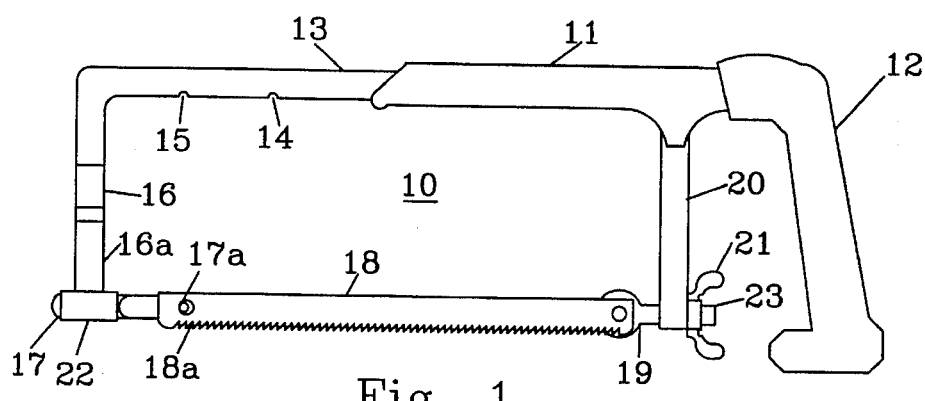
FIG. 1 is a prior art hack saw.

FIG. 1 is a prior art hack saw 10 with a frame 11, 13. On one end of frame 11 is handle 12, and on frame 13 is blade retainer 16a on vertical frame part 16. Blade retainer 16a has a shaft 17 that is in holder 22. Blade is attached to shaft 17 by pin 17a extending through hole 18a in one end of blade 18. The opposite end of blade 18 is attached to holder 19 extending though one end of vertical member 20 and held in place by nut 21 threaded on threads 23. It is the tension of pulling the end of blade 18 held by holder 19 against pin 17a that hold blade 18 tight in place. Frame 13 has two notches 14 and 15 used to adjust the overall length of frames 11 and 13.

Figure 2:
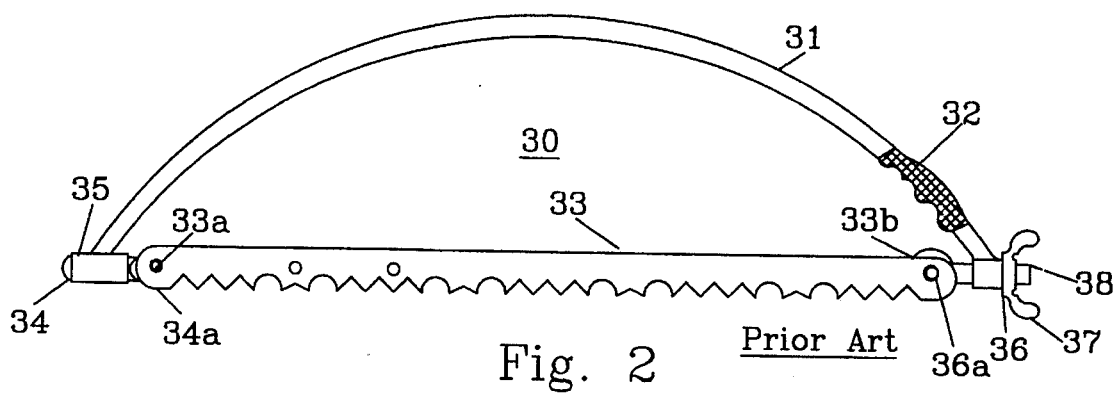
FIG. 2 is a prior art bow saw.

FIG. 2 shows a prior art bow saw 30 having a bowed frame 31 with a handle 32. Mounted on the ends of frame 31 are blade holders 34 and 36 between which saw blade 33 is attached. Holder 34 is mounted in part 35 on one end of bow 31. Pin 33a is in blade hole 34a and pin 36a is in hole 33b. By tightening nut 37 on screw 38, blade 33 is held in place.

In the two prior art saws, the actual sawing is done in the central portion of the blade. Neither saw 10 nor saw 30 can be placed in a narrow area that has a span less than the distance from the central portion of each blade to the frame, frame 11–13 in FIG. 1 and frame 31 in FIG. 2.

Figure 3:
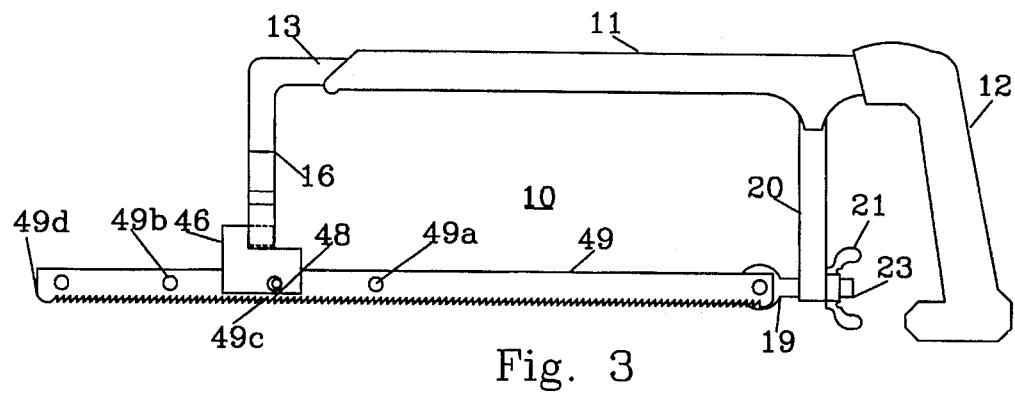
FIG. 3 shows the saw attachment and metal saw type blade according to the invention attached to a hack saw frame.

FIG. 3 shows the blade attachment device 46 and multipurpose blade 49 of the present invention. Blade attachment device 46 and blade 49 are used in conjunction with a hack saw frame. Hack saw frame consisting of handle 12 and frame elements 11, 13, 16 and 20 is the same as the hack saw frame of FIG. 1. Blade attachment device 46, shown in detail in two embodiments in FIGS. 6 and 8, attaches to the end of saw frame 16 and attaches blade 49, via one of holes 49a, 49b or 49c, to the end of frame 16. The end of blade 49 opposite the end portion attached to attachment 46 is attached to holder 19, and held in place through frame 20 by screw 23 and wing nut 21. End 49d of blade 49 extends beyond frame 16 and can be used as a key hole saw, or used to saw in a small hole or in a space limited area. Saw blade 49 in FIG. 3 has teeth of a type that can be used for sawing metals and plastics.

Figure 4:
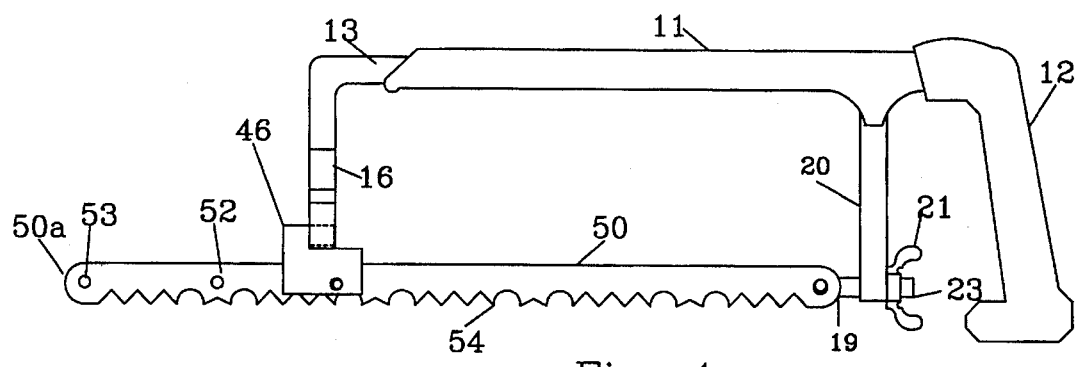
FIG. 4 is the saw attachment and wood bow-type blade according to the present invention attached to a hack saw frame.

FIG. 4 shows the attachment device 46 and a multipurpose wood cutting blade 50 with teeth 54 according to the present invention. Blade attachment device 46 and blade 50 are used in conjunction with a hack saw frame. The hack saw frame consisting of handle 12 and frame elements 11, 13, 16 and 20 is the same as the hack saw frame of FIG. 1. Blade attachment 46, shown in detail in two embodiments in FIGS. 6 and 8, attaches to the end of saw frame 16 and attaches blade 50, via one of holes 51, 52 and 53, to the end of frame 16. The end of blade 50 opposite the end portion attached to attachment 46 is attached to arm 19, and held in place through frame 20 by screw 23 and wing nut 21. End 50a of blade 50 extends beyond of frame 16 and can be used as a key hole saw, or used to saw in a small hole or in a limited space. The saw blade in FIG. 4 is a blade of a type that can be used for wood, and wood fibrous materials such as tree limbs.

Figure 5:
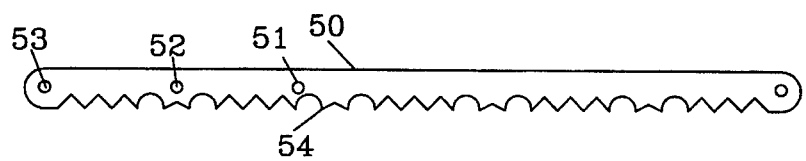
FIG. 5 illustrates a wood saw blade according to the present invention.

FIG. 5 shows the basic structure of a saw blade 50 with teeth 54 used in conjunction with attachment device 46. While blade 50 can be used in a standard hack saw, it is multipurpose as it has a plurality of holes 51–53 which can be attached between frame 20 by arm 19 and attachment 46 on frame 16. A standard blade, having only one hole on each end, cannot be used as a "key hole" saw blade since it will not extend beyond the end of attachment 46.

Figure 6:
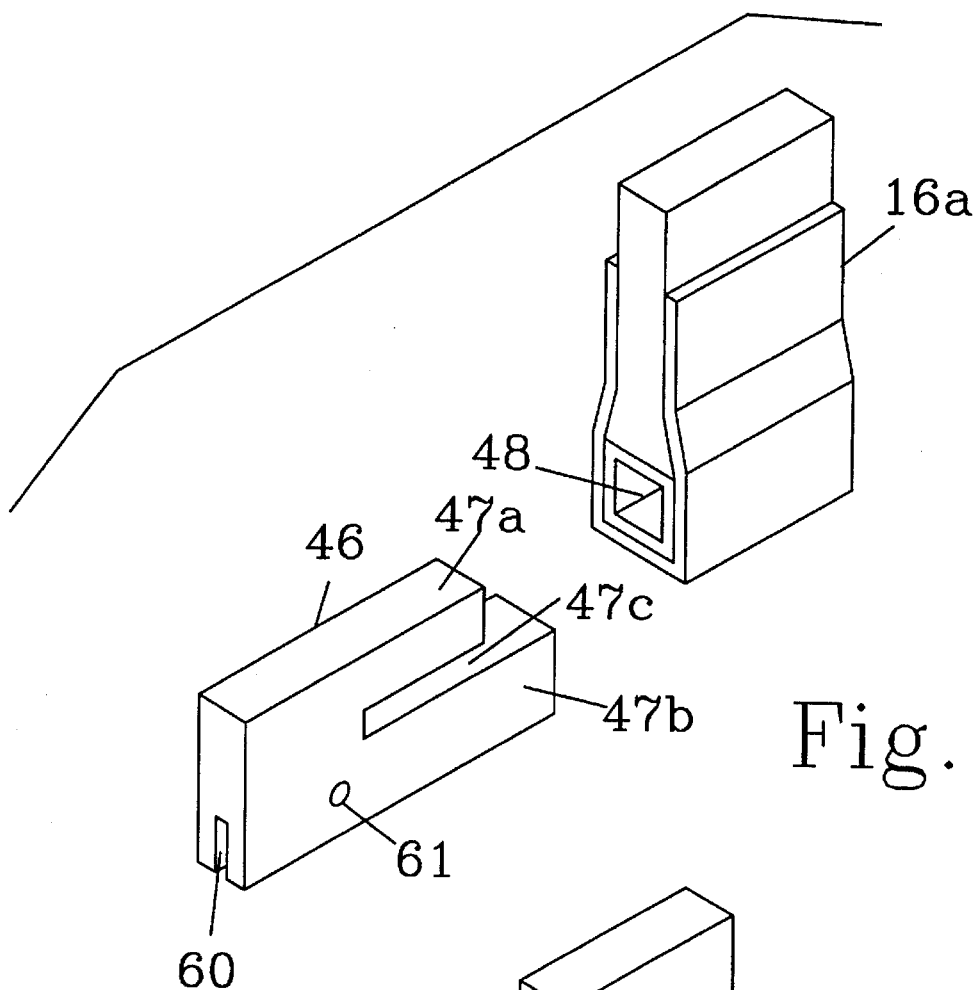
FIG. 6 shows the attachment device configuration with the end of the hack saw frame.
Figure 7:
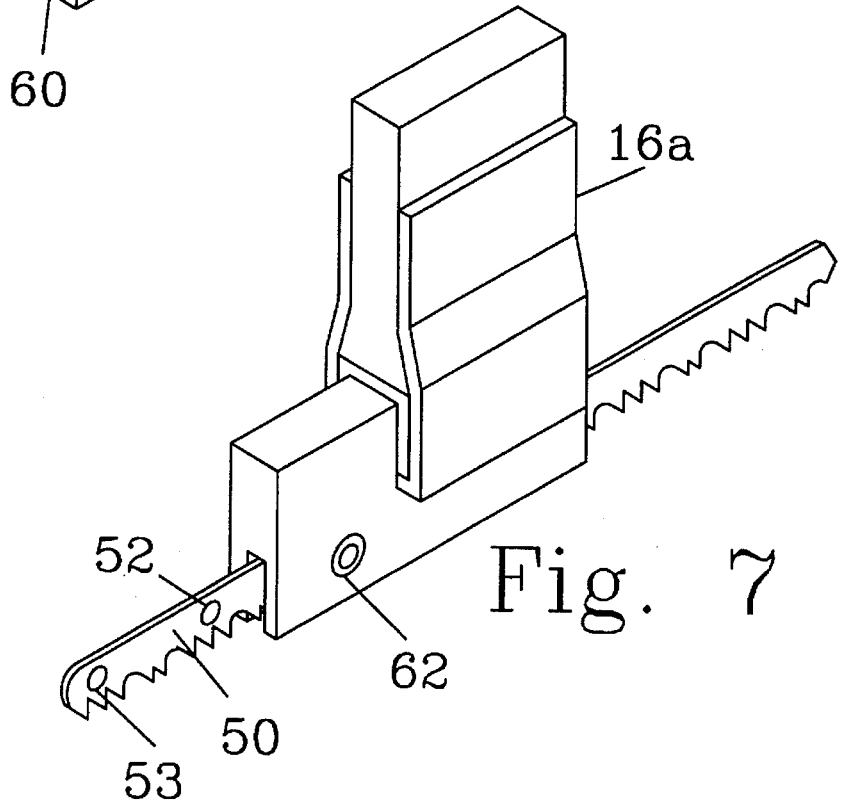
FIG. 7 shows the attachment device in combination with the end of the hack saw frame.

FIGS. 6 and 7 show the basic construction and relationships between attachment device 46, blade 50 and frame 16a. Attachment device 46 incudes to arms 47a and 47b, separated by channel 47c. Arm 47b has a channel 60 extending its length and an opening 61 extending laterally to and through channel 60. Arm 47a is placed in opening 48 in frame 16a. Blade 50 is placed in channel 60 with one of holes 51–53 (FIG. 5) aligned with opening 61 with a pin 62 inserted into and extending through opening 61, one of saw holes 51–53, and arm 47b, securing blade 50 in channel 60. The end of blade 50 opposite the end or portion secured in attachment device 46 is attached to frame 20 with holder 19, as illustrated in FIG. 4.

Figure 8:
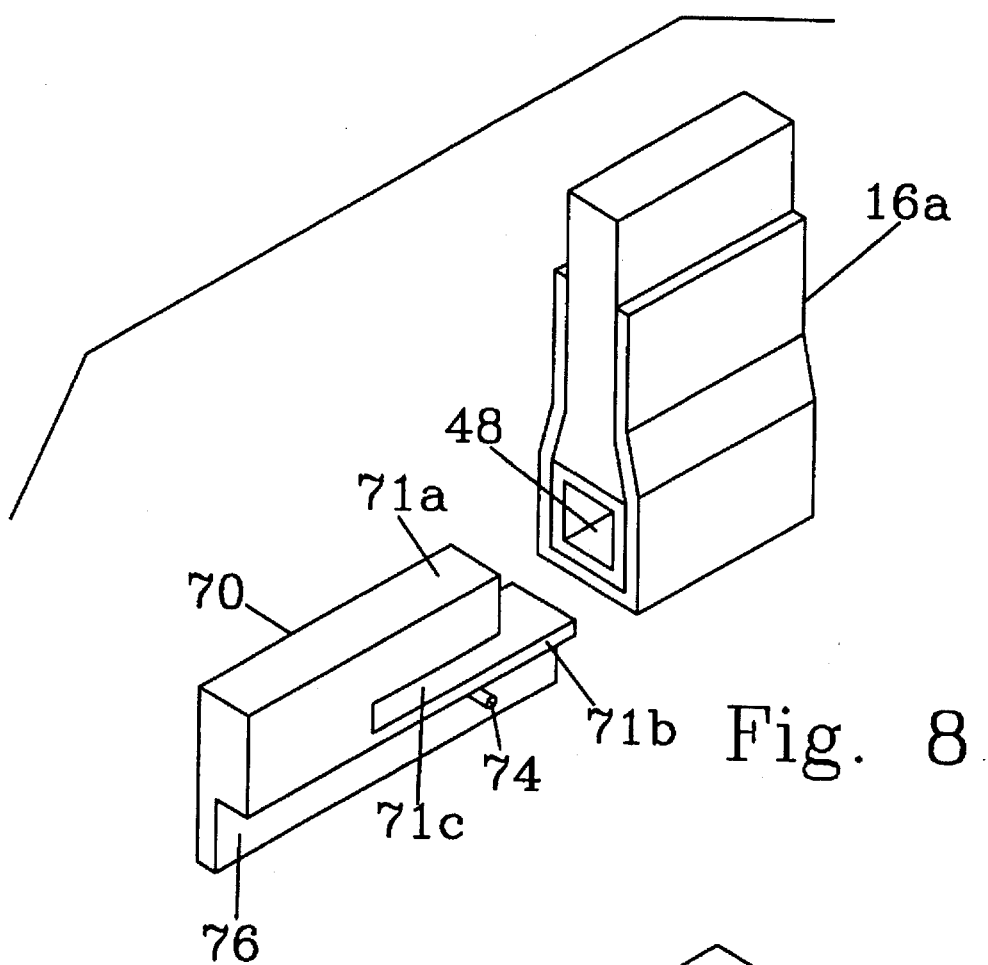
FIG. 8 is a second embodiment of the attachment device with the end of the hack saw frame.
Figure 9:
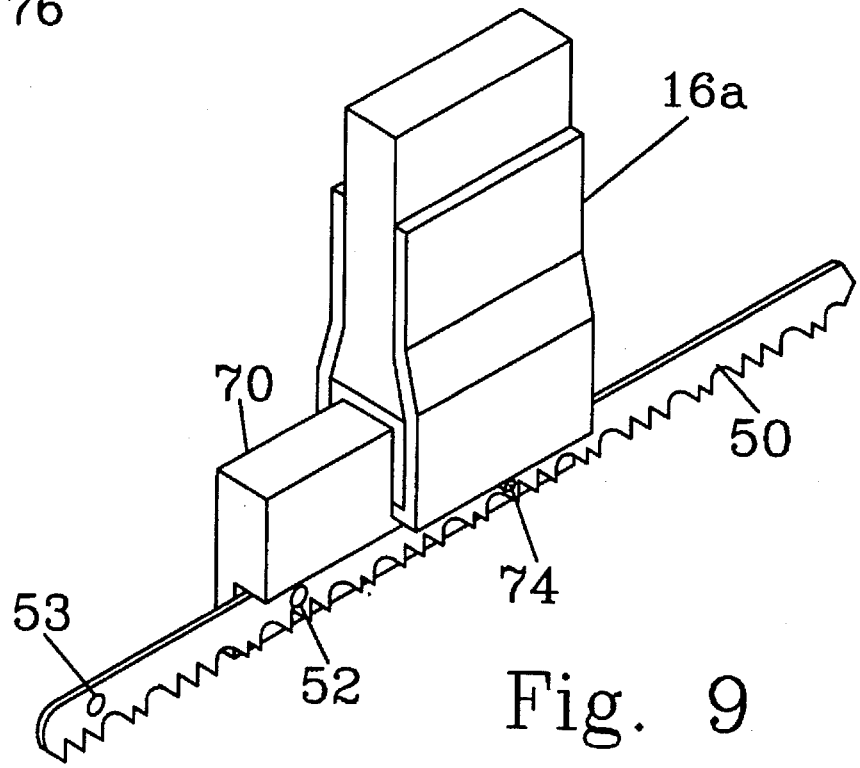
FIG. 9 shows the attachment device second embodiment in combination with the hack saw frame.

FIGS. 8 and 9 show the basic construction and relationships between attachment device 70, blade 50 and frame 16a, of a second embodiment of the blade attachment device. Attachment 70 includes two arms 71a and 71b, separated by channel 71c. Arm 71b has a reduced section 76 instead of a channel extending its length. Arm 71a is placed in opening 48 in frame 16a. Blade 50 is placed in reduced section 76 with a pin 74, which is secured to arm 71b, in one of holes 51–53 (FIG. 5). The end of blade 50 opposite the end or portion secured to attachment 70 is attached to frame 20 with holder 19, as illustrated in FIG. 4. When wing nut 21 pulls holder 19 into frame 20, blade 50 pulls against pin 74 holding blade 50 in place.

What is claimed is:

1. The combination of an attachment device and a saw blade for a hack saw frame having a frame and a first and a second saw blade support devices, comprising:

said attachment device having a first and a second arm, wherein one of said arms is insertable into the hack saw frame in replacement of one of the saw blade support devices; and a saw blade attaching channel in said attachment device;

said saw blade having at least one hole in a first end and a plurality of holes spaced apart in a second end thereof, attached between the attachment device and the other of the saw blade support devices.

2. The combination according to claim 1, wherein the saw blade is held in position in the attaching channel by a pin extending through the attachment device and the saw blade.

3. The combination according to claim 1, wherein said saw blade attaching channel is open on one side extending the length of the attachment device and has an attachment pin to hold the saw blade.

4. The combination according to claim 1, wherein said attachment device is held in place by tension of the saw blade.

5. A saw blade attachment device for a hack saw frame, said hack saw frame having a first and a second saw blade support devices, comprising:

an attachment body having a first and a second arms wherein one of said arms is insertable into the hack saw frame in replacement of one of the saw blade support devices;

a saw blade attaching channel in said second arm for receiving a saw blade; and a pin for securing the saw blade in the saw blade attaching channel.

6. The attachment device according to claim 5, wherein said saw blade attaching channel is open on one side extending the length of the attachment device.

7. The attachment device according to claim 5, wherein said attaching channel extends completely through the second arm allowing the saw blade to extend beyond the channel.

8. The attachment device according to claim 5, wherein said second arm has an opening therethrough, and said pin is a press fit pin which is inserted into said opening to secure the blade in said channel.

9. The attachment device according to claim 5, wherein said channel has a pin therein for holding the saw blade within the channel.

10. The attachment device according to claim 5, wherein said channel is open along its length for inserting said blade.

* * * * *